United States Patent [19]

Kaczur et al.

[11] Patent Number: 5,599,518
[45] Date of Patent: Feb. 4, 1997

[54] CATALYTIC PROCESS FOR CHLORINE DIOXIDE GENERATION FROM CHLORIC ACID

[75] Inventors: Jerry J. Kaczur; David W. Cawlfield; Sudhir K. Mendiratta; Kenneth E. Woodard, Jr., all of Cleveland, Tenn.

[73] Assignee: Olin Corporation, Cheshire, Conn.

[21] Appl. No.: 348,012

[22] Filed: Dec. 1, 1994

[51] Int. Cl.[6] .................................................. C01B 11/02
[52] U.S. Cl. ............................................ 423/477; 423/478
[58] Field of Search .................................... 423/478, 477

[56] References Cited

U.S. PATENT DOCUMENTS

| | | |
|---|---|---|
| 4,362,707 | 12/1982 | Hardee et al. . |
| 4,381,290 | 4/1983 | Hardee et al. . |
| 4,426,264 | 1/1984 | Hardee et al. . |
| 4,501,824 | 2/1985 | Hardee et al. . |
| 4,578,261 | 3/1986 | Lobley ..................... 423/478 |
| 4,938,943 | 7/1990 | Norell . |
| 4,978,517 | 12/1990 | Norell et al. . |
| 4,986,973 | 1/1991 | Svedin et al. . |
| 5,002,746 | 3/1991 | Norell . |
| 5,084,148 | 1/1992 | Kaczur et al. . |
| 5,089,095 | 2/1992 | Cawlfield et al. . |
| 5,091,166 | 2/1992 | Engström et al. . |
| 5,091,167 | 2/1992 | Engström et al. . |
| 5,093,097 | 3/1992 | Engström et al. . |
| 5,174,868 | 12/1992 | Lipsztajn et al. . |
| 5,223,103 | 6/1993 | Kaczur et al. . |
| 5,242,553 | 9/1993 | Kaczur et al. . |
| 5,242,554 | 9/1993 | Kaczur et al. . |
| 5,248,397 | 9/1993 | Cawlfield et al. . |
| 5,258,105 | 11/1993 | Kaczur et al. . |
| 5,264,089 | 11/1993 | Kaczur et al. . |
| 5,284,553 | 2/1994 | Lipsztajn et al. . |
| 5,296,108 | 3/1994 | Kaczur et al. . |
| 5,322,598 | 6/1994 | Cawlfield et al. . |
| 5,348,683 | 9/1994 | Kaczur et al. . |
| 5,354,435 | 10/1994 | Kaczur et al. . |

FOREIGN PATENT DOCUMENTS

WO92/20618 11/1992 WIPO .

*Primary Examiner*—Ngoc-yen Nguyen
*Attorney, Agent, or Firm*—William A. Simons

[57] ABSTRACT

A process and apparatus for producing chlorine dioxide comprising chemically reducing chloric acid with water in the presence of any oxygen-evolving catalyst and in the absence of another acid or an added reducing agent, thereby producing chlorine dioxide and oxygen.

15 Claims, 2 Drawing Sheets

CATALYTIC PROCESS FOR CHLORINE DIOXIDE GENERATION FROM CHLORIC ACID

BACKGROUND OF THE INVENTION

1. Field of the Invention

The present invention is directed to a specific process and a specific apparatus for generating chlorine dioxide directly from aqueous solutions of chloric acid or chloric acid/sodium chlorate mixtures employing an oxygen-evolving catalyst. In particular, the present invention relates to a specific process that employs the chemical reduction of chloric acid with water in the presence of an oxygen-evolving catalyst without the use of or addition of either another acid or an added reducing agent.

Furthermore, the present invention relates to an apparatus for generating chlorine dioxide using a reaction zone containing an oxygen-evolving catalyst that is physically separate, but hydraulically connected to an aqueous chloric acid/chlorine dioxide gas disengagement zone.

2. Brief Description of the Art

Chlorine dioxide has found wide use as a disinfectant in water treatment/purification, as a bleaching agent in pulp and paper production, and in a number of other uses because of its high oxidizing power. There are a number of chlorine dioxide generator systems available in the marketplace. Most of the very large scale generators utilize an alkali metal chlorate salt, a reducing agent, and a strong acid. If sodium chloride is employed as a reducing agent or if hydrogen chloride is employed as the acid, then a mixture of chlorine and chlorine dioxide is produced.

Generally, the additional presence of chlorine in a chlorine dioxide product is not desired and, for that reason, many processes have been developed to produce chlorine dioxide having little or no chlorine concentration therein. These processes use nonchlorine-containing acids such as sulfuric acid and reducing agents such as hydrogen peroxide, methanol or other organic compounds, sulfur dioxide or other sulfur-oxygen species having a sulfur valence of less than +6, nitrogen oxide, nitrogen dioxide, or carbon monoxide and the like.

However, if organic compounds are used as reducing agents in these processes, unreacted volatile organics including formic acid may be present in the chlorine dioxide product. Their presence may be generally undesirable for many applications. If sulfur-containing acids or reducing agents are used, sulfate salts or sulfuric acid may accumulate in the reaction system as undesirable byproducts. If gaseous reducing agents such as sulfur dioxide or carbon monoxide are employed, complex reactor designs and process control systems must be employed to prevent such unreacted gaseous reducing agents from leaving the reaction zone with the chlorine dioxide product.

Furthermore, prior art processes for the production of chlorine dioxide that use alkali metal chlorates and excess acid precursors accumulate as alkali metal salts in the reaction system. This salt accumulation must be periodically removed from the system as an unwanted byproduct, either as a solid or liquid solution. This periodical removal may cause a temporary shutdown of the reaction system as well as the end process that the chlorine dioxide is being used to treat.

Numerous U.S. patents describe processes for generating chlorine dioxide by reacting an alkali metal chlorate, a mineral acid, and a reducing agent. Examples of such U.S. Pat. Nos. included 4,938,943 (Norell); 4,978,517 (Norell et al.); 4,986,973 (Svedin et al.); 5,002,746 (Norell); 5,091,166 (Engström et al.); 5,091,167 (Engström et al.); and 5,093,097 (Engström et al.)

Separately, it is known to generate chlorine dioxide by reacting an aqueous solution of an alkali metal chlorate and a mineral acid such as sulfuric acid or phosphoric acid in the presence of selected catalysts.

For example, U.S. Pat. No. 4,362,707, which issued to Hardee et al. on Dec. 7, 1982, teaches a process for generating chlorine dioxide reacting an alkali metal chlorate and an acid in the presence of catalyst comprising the mixture of valve metal oxide and at least one of ruthenium oxide, iridium oxide, palladium oxide, rhodium oxide, and platinum oxide. Sulfuric acid, hydrochloric acid, and phosphoric acids are the only explicitly named acids for this process. (See col. 4, lines 47–50; col. 6, lines 33–37; and claim 2 of the '707 patent.)

U.S. Pat. Nos. 4,381,290 and 4,501,824, both of which issued to Hardee et al. on Apr. 26, 1983 and Feb. 26, 1985, respectively, teach a process for reacting an alkali metal chlorate with an acid feedstock in the presence of a heterogeneous catalyst that is substantially insoluble in the reactant solutions and is selected from at least one ruthenium oxide, iridium oxide, palladium oxide, rhodium oxide, and platinum oxide. Sulfuric acid, hydrochloric acid, and phosphoric acid are the only explicitly named acids for this process. See col. 4, lines 65–68; col. 6, lines 51–55; and claim 2 of the '290 patent.

Also, it is known to generate chlorine dioxide electrochemically from an aqueous feedstock solution of an alkali metal chlorate and a mineral acid.

U.S. Pat. No. 4,426,263, which issued to Hardee et al. on Jan. 17, 1984, teaches an electrochemical process for generating chlorine dioxide involving electrolyzing the combination of a chlorate-containing feedstock with an aqueous strong acid in an electrolytic cell having an electrocatalytic cathode, including certain platinum group metal oxide mixtures. Sulfuric acid, hydrochloric acid, and phosphoric acid are the only explicitly named acids for this process. (See col. 4, lines 66–68; col. 6, lines 46–50; and claims 1, 2, 3, and 7 of this '263 patent.) The electrochemical cell for this process has an electrocatalytic cathode mode from a platinum group metal oxide mixture selected from a group consisting of ruthenium-rhodium, ruthenium-palladium, rhodium-palladium, iridium-rhodium, iridium-platinum, and ruthenium-rhodium-palladium.

U.S. Pat. No. 4,767,510, which issued to Lipsztajn on Aug. 30, 1988, teaches a process for generating chlorine dioxide by an electrochemical process where an aqueous acidic solution of chlorate ions having a total acid greater than 7 normal sulfuric acid is subjected to a cathodic electrical current. The cathode for this electrolytic cell is constructed of an electrochemically active material which is also chemically inert and noncatalytic with respect to the production of chlorine dioxide.

To avoid the formation of some or all of the above-noted byproducts, it has also been proposed to use chloric acid instead of all or part of the alkali metal chlorate salt precursor for chlorine dioxide generating systems.

For example, see U.S. Pat. Nos. 5,084,148 (Kaczur et al.); 5,174,868 (Lipsztajn et al.); 5,223,103 (Kaczur et al.); 5,242,553 (Kaczur et al.); 5,242,554 (Kaczur et al.); 5,248,397 (Cawlfield et al.); 5,258,105 (Kaczur et al.); 5,264,089 (Kaczur et al.); 5,284,443 (Lipsztajn et al.); 5,296,108 (Kaczur et al.); 5,322,598 (Kaczur et al.); 5,348,683 (Kaczur et al.); and 5,354,435 (Kaczur et al.).

Also, it is known to electrolyze a chloric acid solution to produce chlorine dioxide. See U.S. Pat. No. 5,089,095 (Cawlfield et al.).

Furthermore, it is known to produce chlorine dioxide by heating a reaction mixture comprising an aqueous solution containing hydrogen ions, chlorate ions, and perchlorate ions in the presence of an oxygen-evolving catalyst in solid form in the absence of an added reducing agent. See U.S. Pat. No. 5,342,601 (Cawlfield et al.).

While the chlorine dioxide generating systems disclosed in the above-noted U.S. patents are quite suitable for many commercial applications, there is still a need for a chlorine dioxide generating system that can do all of the following:

(1) can be easily and safely started-up and shutdown;

(2) preferably employs a chemical precursor or precursors that do not generate any byproduct salts or the like that require periodic shutdown of the process;

(3) has a process design that prevents potentially hazardous chlorine dioxide concentrations from accumulating, especially when electric power is lost unexpectedly or shutdown;

(4) has a process design that can introduce the heat required to evaporate water in a way to avoid decomposition of the chlorine dioxide product;

(5) has a process design that both prevents corrosion of the apparatus in the reaction system and avoids the need for costly corrosion resistant materials;

(6) has a process design that utilizes a minimum of moving parts and seals, thereby reducing the potential for leaks of the reactive precursors or the chlorine dioxide product; and (7) has a process design that can operate at steady state conditions with a minimum number of controls and sensors.

Despite the seemingly small differences between the process and apparatus of the present invention from those of the prior art, it will be apparent that these differences provide a novel means of chlorine dioxide generation that uniquely provides a safe and inexpensive generator meeting all of these conditions.

BRIEF SUMMARY OF THE INVENTION

One aspect of the present invention is directed to a process for producing chlorine dioxide comprising chemically reducing chloric acid with water in the presence of any oxygen-evolving catalyst and in the absence of both another acid and an added reducing agent, thereby producing chlorine dioxide and oxygen.

A second aspect of the present invention is directed to a process for producing chlorine dioxide comprising introducing an aqueous chloric acid solution into a reaction zone containing an oxygen-evolving catalyst; and while in said reaction zone, chemically reducing the chloric acid in said aqueous chloric acid solution with water in the presence of said oxygen-evolving catalyst and in the absence of both another acid and an added reducing agent, thereby producing chlorine dioxide and oxygen.

A third aspect of the present invention is directed to a process for producing chlorine dioxide comprising:

(a) introducing an aqueous chloric acid solution into a reaction zone containing an oxygen evolving catalyst;

(b) chemically reducing chloric acid with water in said reaction zone in the presence of said oxygen-evolving catalyst and in the absence of both another acid and an added reducing agent, thereby producing a reaction product comprising chlorine dioxide, oxygen, water vapor, and a spent aqueous chloric acid solution;

(c) transferring said reaction product to a disengagement zone;

(d) separating a gas phase comprising chlorine dioxide, oxygen, and water vapor from a liquid phase comprising said spent aqueous chloric acid solution; wherein said reaction zone is physically separated but hydraulically connected to said disengagement zone and said reaction zone immediately drains empty when said aqueous chloric acid solution is no longer introduced, thereby immediately stopping the chemical reduction of said aqueous chloric acid solution.

A fourth aspect of the present invention is drawn to an apparatus for generating chlorine dioxide comprising:

(a) a source for an aqueous chloric acid solution;

(b) a reaction zone containing an oxygen-evolving catalyst, said reaction zone (i) capable of converting said aqueous chloric acid solution into a reaction product comprising chlorine dioxide, oxygen, water vapor, and a spent aqueous chloric acid solution; and (ii) designed to immediately drain empty when said aqueous chloric acid solution is no longer introduced into said reaction zone, thereby immediately stopping the chemical reduction of said aqueous chloric acid solution;

(c) a conduit for introducing said aqueous chloric acid solution from said source to said reaction zone;

(d) a gas/liquid disengagement zone for separating a gas phase containing chlorine dioxide, oxygen, and water vapor from a liquid phase comprising said spent aqueous chloric acid solution;

(e) a conduit for transferring said reaction product from said reaction zone to said gas/liquid disengagement zone;

(f) a conduit for removing said separated gas phase from said gas/liquid disengagement zone; and (g) a conduit for removing said separated liquid phase from said gas/liquid disengagement zone.

DESCRIPTION OF PREFERRED EMBODIMENTS

Figure 1:
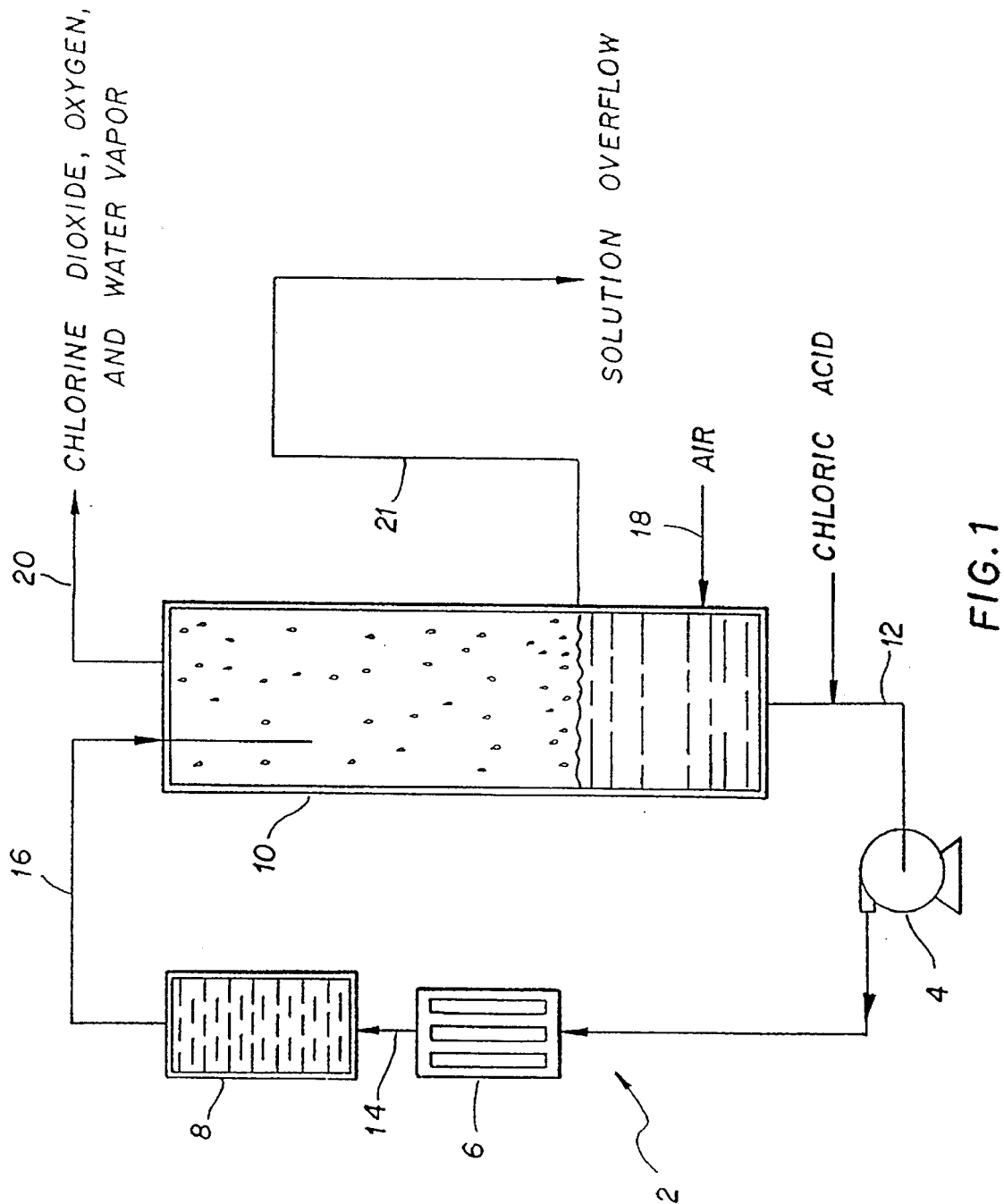
FIG. 1 illustrates a flow chart of one preferred embodiment of the present invention that utilizes an aqueous chloric acid solution feed stream, circulation pump, heat exchanger, fixed catalyst bed, and aqueous chloric acid-chlorine dioxide gas disengagement zone.

The term "aqueous chloric acid solution" as used as the chlorine dioxide precursor in the present specification and claims is intended to mean only aqueous solutions of pure chloric acid or aqueous solution mixtures of chloric acid and alkali metal chlorate where such aqueous solutions are substantially free of both anionic and cationic impurities (i.e., contains less than 1.0%, preferably less than 0.1%, by weight of total anionic and cationic impurities). The preferred precursor is aqueous solution of pure chloric acid in which the concentration of the chloric acid is at least 5% by weight, more preferably, from about 10% to about 50% by weight. Alternatively, the chlorine dioxide precursor may be an aqueous solution of chloric acid and an alkali metal chlorate in which the concentration of the chloric acid is at least about 5% by weight and the mole ratio of chloric acid to the alkali metal chlorate is from about 1:2 to about 250:1. The preferred alkali metal chlorate salt is sodium chlorate. It is appreciated that if an alkali metal chlorate is present in the precursor solution, amounts of that salt will accumulate in the reaction system, which will have to be removed and collected or disposed of. Accordingly, pure chloric acid solutions are preferred to minimize the reaction system shutdowns.

As stated above, the process of the present invention is drawn to the chemical reduction of chloric acid with water in the presence of an oxygen-evolving catalyst without the use or addition of either another acid or an added reducing agent. The reduction reaction of the chloric acid with water in the presence of the oxygen evolution catalyst is believed to be as follows:

$$2HClO_3 + H_2O \rightarrow 2ClO_2 + 1/2O_2 + 2H_2O$$

In using an aqueous chloric acid/alkali metal chlorate solution as the feedstock, the chloric acid reacts and the spent reaction solution is an alkali metal chlorate solution, with a small unreacted residual amount of chloric acid.

High purity chloric acid solutions can be produced by the oxidation of high purity hypochlorous acid solutions. One process suitable for producing the chloric acid solutions heats a hypochlorous acid solution, containing from about 35% to about 60% by weight of HOCl, at a temperature in the range of from about 25° to about 120° C.

This process is represented by the following reactions (A) plus (B) or their sum which is reaction (C):

$$3HOCl \rightarrow HClO_3 + 2HCl \quad (A)$$

$$2HOCl + 2HCl \rightarrow 2Cl_2 + 2H_2O \quad (B)$$

$$5HOCl \rightarrow HClO_3 + 2Cl_2 + 2H_2O \quad (C)$$

Thermal oxidation of hypochlorous acid takes place at ambient temperatures and autogenous pressures. To increase the rate of production of chloric acid, the reactant may be decomposed at elevated temperatures. The concentrated hypochlorous acid solution may be heated at temperatures, for example, in the range of from about 50° to about 120° C., and preferably in the range of from about 70° to about 110° C. to increase the rate of decomposition of the hypochlorous acid and hence the rate of production of chloric acid.

Another process for producing the high purity chloric acid solution utilizes the anodic oxidation of the high purity concentrated hypochlorous acid solution in an electrolytic cell having an anode compartment, a cathode compartment, and a cation exchange membrane separating the anode compartment from the cathode compartment. In operation, the process includes feeding an aqueous solution of hypochlorous acid to the anode compartment, and electrolyzing the aqueous solution of hypochlorous solution at a temperature of from about 0° to about 80° C. to produce the chloric acid solution.

The process is represented by the following reaction:

$$HOCl + 2H_2O \rightarrow HClO_3 + 2H_2 + 4e^-$$

Chloric acid solutions can be produced by these processes in any concentrations desired up to about 50% by weight of $HClO_3$. However, preferred concentrations are those in the range of from about 5% to about 45% by weight of $HClO_3$.

Aqueous chloric acid/alkali metal chlorate solutions are produced by the electrolysis of alkali metal chlorate solutions. See the above-noted U.S. patents for preferred processing parameters.

The catalyst employed in the process is named an oxygen evolution catalyst in this process application because the catalytic reaction proceeds in a manner such that water is a reducing agent for the reduction of chloric acid to chlorine dioxide and producing oxygen as a byproduct. Suitable oxygen-evolving catalysts include, for example, metals and oxides of the elements of Group VIIIA of the Periodic Table of Elements (Handbook of Chemistry and Physics, 68th Edition, CRC Press, Inc. Boca Raton, Fla., 1978–88, inside cover). Platinum group metals including platinum, palladium, iridium, rhodium, and ruthenium; and mixtures or alloys of these platinum group metals may be employed. Additionally, oxides of the platinum group metals such as iridium, rhodium, or ruthenium, as well as mixtures of these oxides with platinum group metals or alloys of these platinum group metals could be suitably employed. Likewise, iron alloys such as stainless steel, nickel or nickel based alloys, and cobalt based alloys can be used as oxygen-evolving catalysts in the process of the invention. Other oxygen-evolving catalysts include semiconductive ceramics known as perovskites. The catalyst may be present as particles suspended in the reaction mixture or supported on an inert substrate. The oxygen-evolving catalysts may be used in the form of a packed bed, slurries, or any structure which will suitably promote mass transfer and increase reaction surface area. In a preferred embodiment of this invention, the catalyst is supported on valve metal heat exchanger surfaces to facilitate evaporation of water during the reaction. Suitable valve metals include titanium, niobium, zirconium, hafnium, and tantalum, among others.

The oxygen evolution catalysts can also be mixed with other metals and oxides either for extending their surface area or to increase reaction rates and reactivity. These include the metals and their oxides above, as well as valve metals such as niobium, titanium, aluminum, zirconium, hafnium, and tantalum. One embodiment is to use the catalysts on a stable support structure such as acid and oxidizer corrosion resistant metals such as titanium, niobium, and zirconium as well as ceramic-type materials such as alumina, zirconium oxide, silica, aluminum silicates, various titanium oxides and titanium suboxides, and natural and synthetic zeolites among others. Preferred are valve metal substrates such as titanium, zirconium, or niobium and valve metal oxide ceramics or glasses such as those containing an aluminum oxide, zirconium oxide, or titanium oxide, or mixtures thereof.

Generally, a flowing stream of aqueous chloric acid solution is heated and then contacted with a physically separate and hydraulically connected fixed structure containing an oxygen evolving catalyst. The catalyst promotes the chemical reduction of chloric acid using water as a reductant to form chlorine dioxide and oxygen gas. The aqueous mixture of gas and liquid is then stripped in a separate disengagement zone of chlorine dioxide, oxygen, and water vapor using an external air stream at atmospheric or super atmospheric pressures or by operating the system at subatmospheric pressures with an external vacuum source. The gas stream of chlorine dioxide, oxygen, and water vapor can then be used in various applications utilizing gas phase reactions or be absorbed or dissolved into water for aqueous phase chlorine dioxide application reactions. The apparatus is designed for safe system start-ups and shutdowns. In one embodiment, this is accomplished by physically separating the catalytic reaction zone from the aqueous solution/gas disengagement zone.

Preferably, a flowing stream of aqueous chloric acid solution is heated and then contacted in a reaction zone containing an oxygen evolving catalyst. The catalyst promotes the chemical reduction of chloric acid using water as a reductant to produce chlorine dioxide and oxygen. The aqueous mixture of gas and liquid is then stripped of chlorine dioxide, oxygen, and water vapor using an external air stream at atmospheric or super atmospheric pressures or by operating the system at subatmospheric pressures with an external vacuum source. The gas stream of chlorine dioxide, oxygen, and water vapor can then be used in various applications utilizing gas phase reactions or be absorbed or dissolved into water for aqueous phase reactions.

The chlorine dioxide generation reaction rate of chloric acid with the oxygen evolution catalyst is determined by liquid mass transfer, total chloric acid concentration, chlorate ion concentration, catalyst surface area, and solution temperature.

The preferred generator chloric acid solution operating temperature from about 0° to 100° C., more preferably between about 5° to 90° C., and more preferably from about 10° to 80° C.

The preferred generator system operating pressures are from subatmospheric in a range from about 50–700 mm Hg to super atmospheric operating pressures ranging from about 1 psig to about 200 psig, preferably from about 1.1 to 100 psig.

When operating under vacuum, the temperature and pressure are related by the boiling point of the solution, so that the absolute pressure is regulated to provide the desired temperature range. When a supply of air is used to operate at atmospheric and super atmospheric pressure, the flow rate of air and the flow of heat determine the partial pressure of water vapor exiting the generator as well as the temperature.

Under either atmospheric or subatmospheric operating conditions, the generation of chlorine dioxide is slightly endothermic. Heat must be supplied to the system at a rate sufficient to provide this heat of reaction in addition to the heat required to evaporate water contained in the chloric acid feed and water produced by the chemical reduction of chloric acid. The precise heat requirement will be apparent to one skilled in the art by the need to control the steady state operating concentration and level of generator solution.

In one of the more preferred embodiments of this process, the control of the process can be performed simply as follows:

1. Air is preheated to a temperature in the range of about 40° C. to about 400° C. by means of a thermostatically regulated heat source. The temperature of the air determines the outlet concentration of chlorine dioxide with higher temperatures producing higher concentrations. An optional heat sensitive electrical connection to the heating element can provide a safety limit to assure that hazardous chlorine dioxide concentrations are not produced.

2. The flow of air is adjusted to produce the desired flow rate of chlorine dioxide product.

3. Chloric acid feed is added to maintain a fixed liquid level in the generator.

An additional optional control mechanism is desired to assure a safe shutdown of the generator in the event of a loss of power. A flow of unheated air through the generator will cool the solution to a temperature at which production of chlorine dioxide will stop. Supply of this air can be provided from a tank of compressed air with a capacity sufficient to cool the generator. In this way, unheated air will continue to flow through the generator even when power is lost sufficient to prevent accumulation and decomposition of chlorine dioxide. In addition, a solid absorbent cartridge can be used to absorb excess chlorine dioxide produced by the generator on shutdown so that it is not released.

A unique property of this process is that when heated air is used, the concentration of chloric acid in the generator is self-regulating. If the concentration is too low for chlorine dioxide generation at the desired rate, water vapor will be removed by evaporation and the water replaced by concentrated chloric acid feed until the required concentration is achieved. If the concentration is higher than its steady state condition, the chlorine dioxide production rate will be higher than the rate of chloric acid addition until the concentration drops. The self-regulating nature of the generated chloric acid concentration in this system is a unique feature of this process.

As stated above, the apparatus of the present invention has an arrangement design in such that the catalytic reaction zone is physically separated and hydraulically connected to the liquid/gas disengagement zone. The reaction proceeds only when chloric acid is pumped or otherwise introduced into the reaction zone. On shutdowns, the pump is stopped and the chloric acid solution drains from the reaction zone into the liquid/gas disengagement zone and the chlorine dioxide generation reaction essentially stops.

FIG. 1 shows one preferred embodiment of the general process scheme and apparatus for generating chlorine dioxide directly from aqueous chloric acid or chloric acid-sodium chlorate mixtures employing an oxygen evolving catalyst. The apparatus 2 consists of an aqueous chloric acid solution source (not shown), circulation pump 4, heat exchanger 6, fixed catalyst bed 8, and gas/liquid disengagement zone 10. In this embodiment, the fixed catalyst bed 8 is physically separate and connected hydraulically to the gas/liquid disengagement zone 10 using a suitable vertical height differential from the liquid level of the chloric acid in the solution/gas disengagement zone.

Chloric acid is pumped or fed from its source (not shown) into conduit 12 at a rate both to keep the solution level constant in the gas/liquid disengagement zone 10 and to supply sufficient reactant to the catalyst bed 8. A motive force transporting means such as an eductor may be used instead of pump 4. The circulation pump 4 on conduit 12 circulates the chloric acid through a heat exchanger 6 used to heat the chloric acid to a suitable temperature such that the reaction of chloric acid with the catalyst in the presence of water in catalyst bed 8 is at a suitable chlorine dioxide generation rate. The heat exchanger 6 can use heat provided by any suitable heating source such as by electrical, steam, or combustion methods. The heat exchanger 6 can be made from any suitable chemically compatible metallic, glass, ceramic, or polymeric materials. Alternatively, a forced heated air source and an air-liquid mixing zone may be employed instead of the heat exchanger 6.

The heated solution enters the catalyst bed 8 by conduit 14 where it reacts to form a two-phase mixture of chlorine dioxide and oxygen and chloric acid aqueous solution. The fixed catalyst bed 8 preferably is a substrate structure coated or covered with catalyst inside a suitable sized vessel. The substrate is generally made from a material chemically compatible with chloric acid. It may be any suitable metal, ceramic, or polymer. The substrate structure is preferably any suitable complex 3-dimensional design with a high surface area so as to increase the contact of the chloric acid solution with the catalyst impregnated or coated on the surfaces of the substrate.

The two-phase gas-aqueous solution that exits the catalyst bed 8 is transferred by conduit 16 to the top of the gas/liquid disengager zone 10. The liquid phase drops down into the solution at the bottom of the zone 10. Air is introduced by conduit 18 at a suitable point either below the solution level or above it such that the air dilutes and transports the chlorine dioxide, oxygen, and water vapor from the zone 10 through a gas exit line 20. A solution overflow line 21 is also provided to help control the liquid level in the solution/gas disengagement zone as required by the system during operation.

Preferably, the oxygen evolving catalyst is deposited on an open porous three dimensional support made from a chemically resistant metallic or nonmetallic material. The structure can be mounted in various locations in the system in the various embodiments, but basically it is located such that on system shutdown it self-drains of any chloric acid solution. The catalyst structure can be of any suitable size and active surface area such that it can generate chlorine dioxide gas at rates suitable for each use application.

Additionally, sections of solution/gas separation packings made from plastic meshes or commercial scrubber packings can be mounted in the gas/liquid separation vessel at strategic locations in order to provide surface area for the increased efficiency separation of gases from the liquid.

The volume amount of catalyst coated structure as a percentage of the total generator volume can range from 0.01% to 95%, preferably 0.1% to 90%, and more preferably 0.2% to 80%. The open support structure can be in the form of saddles, spheres, meshes or pads, or any form suitable and available in the art for use in gas-liquid scrubber systems. The catalyst coated structure can also be located in one or more areas in the generator.

Figure 2:
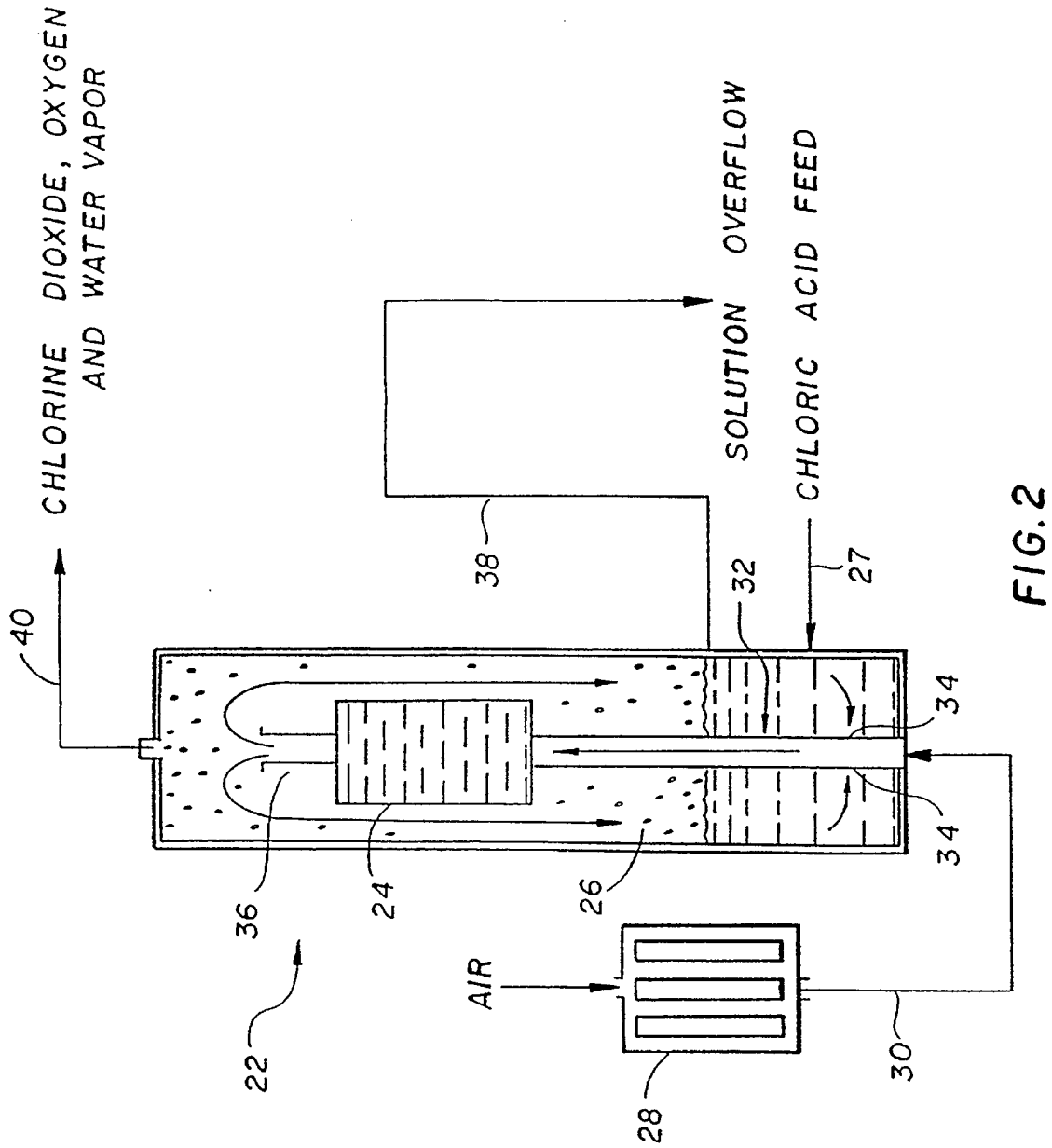
FIG. 2 illustrates a flow chart of another embodiment of the present invention wherein an oxygen-evolving catalyst-containing reaction zone is mounted in the upper section of gas/liquid disengagement zone or vessel so that an aqueous chloric acid solution is percolated through the catalyst-containing reaction zone.

Another preferred embodiment is shown by FIG. 2. In this embodiment, the catalyst coated structure is mounted within the upper section of the generator solution or gas/liquid separation zone such that the chloric acid solution is percolated by various methods through the catalyst bed.

FIG. 2 shows an alternative chlorine dioxide generator apparatus set-up 22 having a separate catalyst zone 24 located in the same compartment as the gas/liquid disengagement zone 26 and which is hydraulically connected to the gas/liquid disengagement zone 26. Chloric acid enters the gas/liquid disengagement zone by conduit 27. Air is passed through a heat exchanger 28 and conduit 30 to heat the air to temperatures between about 40°–400° C. and which is introduced into a standpipe 32 in the generator 22 that is connected into the catalyst-containing vessel 24 located above the liquid level of chloric acid in the gas/liquid disengagement zone compartment 26. The standpipe 32 contains holes 34 located under the chloric acid solution level such that the flow of air acts as the motive force for aspirating the chloric acid liquid into the gas stream. The heated gas stream with chloric acid then enters into the catalyst bed vessel 24 and exits out above the catalyst vessel 24 through a short pipe 36. The catalyst bed 28 preferably contains a catalyst coating on a high surface area support structure to increase the area for the reduction of chloric acid to chlorine dioxide and oxygen. This set up is similar to percolating liquid through coffee grinds in a coffee percolator. This system in FIG. 2 also contains a solution overflow line 38 to allow for the chloric acid solution level in the generator system to remain constant in the event that too much chloric acid is introduced into the generator.

The liquid and chlorine dioxide containing gaseous products are then separated or disengaged in the air space above the catalyst vessel. The chlorine dioxide, water vapor, and oxygen exit the generator system by conduit line 40, and the spent chloric acid falls down in the chloric acid solution located below the catalyst vessel. Optional additional equipment may be added to the system such as a demister pad or gas/liquid impingement plate or hat that is mounted or used above the standpipe where the gas/liquid exits the catalyst vessel to minimize liquid entrainment into the gas product stream. On system shutdown, the chloric acid solution present in the catalyst bed drains freely by gravity back into the liquid level in the liquid/gas disengagement zone of the reactor. The air line to the generator can be optionally routed coming in through the top of the generator vessel and into the bottom of the standpipe so that there is no bottom connection required to the generator which may hold chloric acid liquid.

There are numerous other alternative arrangements or embodiments of contacting a heated chloric acid solution with the catalyst bed, many of which that can be designed by those skilled in the art. The basic feature requirement is that the chloric acid reactant is heated and is allowed to pass through a separate catalyst containing bed by some motive force such as eductor or by a pump or by compressed air, the spent chloric acid and gaseous products are separated, and the chlorine dioxide reaction is stopped by stopping the flow of reactant into the catalyst bed with the remaining chloric acid in catalyst bed freely draining out of the catalyst bed.

In another embodiment, the catalyst coated structure could be mounted in the piping going to the top of the scrubber and have the chlorine dioxide reaction occur in that area. Optionally, the catalyst coated structure could be so mounted in the piping arrangement such that a valve could be opened to allow solution to go through the material to produce additional chlorine dioxide when it is required, thus optimizing chloric acid consumption. The same could be done in the gas disengagement zone where a device for allowing solution to contact the catalyst when wanted could be installed.

Other embodiments of the generator design include (1) the use of a hot air source instead of external heat to provide the temperature needed for the reaction to proceed at suitable rates and to provide the dilution required for the chlorine dioxide as well as to provide the motive force for pumping/forcing the chloric acid into the catalyst reaction zone; and (2) catalyst bed positioned inside solution/gas disengager wherein the catalyst bed is positioned in the upper part of the solution/gas disengager zone or vessel and connected with a pipe below the chloric acid solution level. A hot air source is injected into the pipe and pumps the chloric acid solution through the catalyst bed and drains back down. No circulation pump is required in this embodiment.

The following experiments are provided to further illustrate the present invention. All parts and percentages are by weight and all temperatures are degrees Celsius unless explicitly stated otherwise.

EXAMPLE 1

This example shows that a ruthenium oxide catalyst coated high surface area titanium felt can produce chlorine dioxide from a heated chloric acid-sodium chlorate solution without externally added acid to the solution.

A ruthenium oxide ($RuO_2$) coated catalyst structure on a titanium fiber felt was prepared for demonstrating chlorine dioxide generation from a chloric acid-sodium chlorate mixture. A 4 inch long by 2 inch wide by 0.125 inch thick titanium felt pad substrate was prepared by compressing 50 gm of 0.002 mil×0.004 mil melt spun titanium fiber obtained from Ribbon Technology Inc. (Gahanna, Ohio) in a steel die. The compressed fiber was then spot welded in numerous points to physically bind or hold the pad together. A ruthenium trichloride solution was then prepared by dissolving 1 gm of $RuCl_3$ in 50 ml of propanol alcohol. The felt pad was heated with a hot air gun and four aliquots of the solution were sequentially painted onto the structure and fully dried. The titanium felt pad was then placed in a 450° C. furnace in air for a period of one hour and then cooled in air to room temperature.

A chloric acid-sodium chlorate mixture was obtained from a bench scale Olin SSC™ electrolytic process cell having with a composition of 18.2% $HClO_3$ with about 24 wt. % $NaClO_3$. About 400 ml of the solution was placed in a 500 ml beaker on a hot plate with a magnetic stirrer. The ruthenium oxide catalyst coated felt pad was immersed into the solution. Oxygen gas bubbles were noted evolving from the solution in significant amounts starting at about 30° C. with chlorine dioxide noted from the solution. The solution color also turned to a light yellow at this temperature indicating chlorine dioxide in the solution phase. The solution yellow color and the oxygen generation rate from the catalyst surface qualitatively increased with the solution temperature which was stopped at about 60° C. in the experiment.

EXAMPLE 2

A glass apparatus was constructed to demonstrate the generation of chlorine dioxide by pumping a heated aqueous chloric acid solution through a physically separate, but hydraulically connected, catalyst section consisting of an $RuO_2$ catalyst coating on an inert high surface area titanium fiber felt substrate, and then removing the generated chlorine dioxide gaseous product from the system with an air stream.

A 500 ml volume 3-neck round bottom glass flask was fitted with a glass thermometer to measure chloric acid solution temperature, an air sparge connection having a ¼" TEFLON® tube routed to the inside bottom of the flask, a circulation pump ¼" TEFLON tube input feed line routed to the inside bottom of the flask, and a 24 inch tall vertical glass piping section having an inside diameter of about ½" with about a 3 inch length section of the piping packed with a catalyst, a glass tee located above the catalyst section where chloric acid is introduced from the circulation pump, and an exit point connection on the glass tubing above the catalyst section where the input air, chlorine dioxide, oxygen, and water vapor gaseous products exit the generator system. The catalyst used in the system was an identical $RuO_2$ catalyst on a titanium fiber structure as described in Example 1 having a specific surface area of about 60 $cm^2/cm^3$ and density of 10% (i.e., 90% porosity). A 6 cm width by 4 cm length of the $RuO_2$ coated felt weighing about 10 gm was cut into six 1 cm×4 cm strips that were packed into the 3-inch long catalyst section in the vertical glass piping, as described above, having a total calculated surface area of 45/$cm^2$. The completed 3-neck round bottom flask $ClO_2$ generator assembly was mounted on top of a hot plate to supply heat to the flask.

The 3-neck flask was filled with about 200 ml of a 35.2 wt. percent aqueous chloric acid solution produced from the anodic oxidation of HOCl and concentrated by vacuum evaporation. A peristaltic pump was used to continuously pump chloric acid from the 3-neck flask at a constant rate of 60 ml/min into the vertical glass pipe section tee above the catalyst section and drained by gravity from the catalyst section down into the flask. Air was introduced into the chloric acid solution by the ¼ inch TEFLON tubing connection into the 3-neck flask and passed up through the chloric acid wetted catalyst and out through the top of the vertical glass section at a constant rate of about 1,200 ml/min to purge the system of the generated chlorine dioxide and oxygen. The system was heated to various chloric acid solution temperatures by adjusting the hot plate settings, and the system was allowed to come to a chlorine dioxide production equilibrium.

The system chlorine dioxide generation rate was measured by directing the gas product stream into a gas collection bottle containing a pH 7.0 buffered KI (potassium iodide) solution for a measured time period. The KI solution was then titrated iodometrically with sodium thiosulfate in a two-step titration method used for determining chlorine dioxide and chlorine as given in Standard Methods for the Examination of Water and Wastewater, 17th edition. The results are given below in Table 1:

TABLE 1

Meaured chlorine dioxide generation rates as a function of various chloric acid temperatures in the flask at constant catalyst surface, constant flowrate through catalyst, and constant air stripping flowrate.

| Chloric Acid Solution Temp. in °C. | $ClO_2$ Production Rate in gm/min | $ClO_2$ Production Rate in gm/hr | $Cl_2$ in $ClO_2$ Product |
|---|---|---|---|
| 46 | 0.0173 | 1.038 | ND |
| 58 | 0.0356 | 2.136 | ND |
| 65 | 0.0617 | 3.702 | ND |
| 71 | 0.0913 | 5.478 | ND |

The two-step KI iodometric analytical method employed showed that chlorine was nondetectable (ND) in the chlorine dioxide gaseous product stream. The flowrate of the chloric acid solution was not sufficient to submerge or wet the entire catalyst bed with liquid. Increased production rates from the generator can be achieved by using higher solution flowrates through the catalyst bed to increase mass transfer, increasing the catalyst surface area by employing catalysts with higher surface areas and increasing the physical catalyst contact area, and by increasing the solution/system reaction temperatures up to the limit of chlorine dioxide decomposition.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for producing chlorine dioxide comprising:
    (a) introducing an aqueous chloric acid solution into a reaction zone containing an oxygen-evolving catalyst;
    (b) chemically reducing chloric acid with water in said reaction zone in the presence of said oxygen-evolving catalyst and in the absence of another acid or an added reducing agent, thereby producing a reaction product comprising a gas phase product and a liquid phase product, wherein said gas phase product comprises chlorine dioxide, oxygen, water vapor, and said liquid phase product comprises a spent aqueous chloric acid solution;

(c) transferring said reaction product to a disengagement zone;

(d) separating said phase product from said liquid phase product; wherein said reaction zone is physically separate, but hydraulically connected to said disengagement zone and said reaction zone immediately drains empty when said aqueous chloric acid solution is no longer introduced, thereby immediately stopping the chemical reduction of said aqueous chloric acid solution.

2. The process of claim 1 wherein said aqueous chloric acid solution is a pure chloric acid solution in which the $HClO_3$ concentration is at least 5% by weight of the solution.

3. The process of claim 1 wherein said pure chloric acid solution has a $HClO_3$ concentration from about 10% to about 50% by weight of the solution.

4. The process of claim 1 wherein said aqueous chloric acid solution is an aqueous chloric acid-alkali metal chlorate solution in which the concentration of chloric acid is at least about 5% by weight of the solution and the mole ratio of said chloric acid to said alkali metal chlorate is from about 1:2 to about 250:1.

5. The process of claim 4 wherein said alkali metal chlorate is sodium chlorate.

6. The process of claim 1 wherein the temperature of said aqueous chloric acid solution in said reaction zone is from about 0° to about 100° C.

7. The process of claim 1 wherein in step (c) said reaction product is removed from said reaction zone by an inert gas diluent stream or by a vacuum.

8. The process of claim 1 wherein said reaction zone has a subatmospheric pressure from about 50 to about 700 mm Hg.

9. The process of claim 1 wherein said reaction zone has a super atmospheric pressure from about 1 psig to about 200 psig.

10. The process of claim 1 wherein said oxygen-evolving catalyst is in solid form selected from Group VIIIA of the Periodic Table of Elements.

11. The process of claim 1 wherein said oxygen-evolving catalyst is a platinum group metal, a platinum group oxide, and mixtures thereof.

12. The process of claim 1 wherein said oxygen-evolving catalyst is an oxide of iridium, rhodium, ruthenium, a mixture of said oxides, a mixture of one or more of said oxides with a platinum group metal, or a mixture of one or more of said oxides with an alloy of platinum group metals.

13. The process of claim 1 wherein said oxygen-evolving catalyst is ruthenium oxide.

14. The process of claim 1 wherein said separating step (d) is effected by the contacting of said reaction product with an air stream at atmospheric or super atmospheric pressures.

15. The process of claim 14 wherein said air is preheated to a temperature from about 40° C. to about 400° C. before contacting said reaction product.

* * * * *